United States Patent [19]

Schierloh

[11] 4,387,474
[45] Jun. 14, 1983

[54] BEEHIVE MEDICATOR

[76] Inventor: J. Calvin Schierloh, Rte. 1, Box 136-D, Santa Maria, Calif. 93454

[21] Appl. No.: 304,844

[22] Filed: Sep. 23, 1981

[51] Int. Cl.³ .................. A01K 51/00; A61M 13/00
[52] U.S. Cl. .................................. 6/12 R; 604/289
[58] Field of Search .............. 6/5, 12 R, 12 M; 128/265; D7/42

[56] References Cited

U.S. PATENT DOCUMENTS

| 2,672,144 | 3/1954 | Cohen | 128/265 |
| 3,320,929 | 5/1967 | Kay | 119/18 |
| 3,515,099 | 6/1970 | Clark et al. | 119/72.5 X |
| 3,817,248 | 6/1974 | Buckles et al. | 128/260 |

FOREIGN PATENT DOCUMENTS 118682  4/1947  Sweden ........................... 6/5

Primary Examiner—Robert P. Swiatek
Attorney, Agent, or Firm—Donald A. Kettlestrings

[57] ABSTRACT

Beehive medicator apparatus for applying powdered medication to the interior of a beehive wherein the apparatus includes a substantially L-shaped, hollow, open-ended, tubular member. A valve is preferably provided within the tubular member for controlling the movement of the powdered medicament through the apparatus, and the lower section of the tubular member defines a horizontally flared open end for uniformly disbursing the powdered medicament throughout the interior of the hive.

14 Claims, 8 Drawing Figures

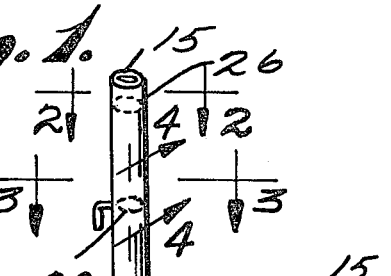
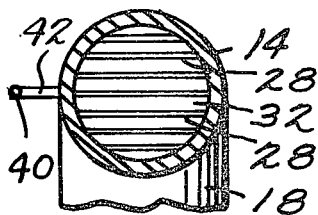
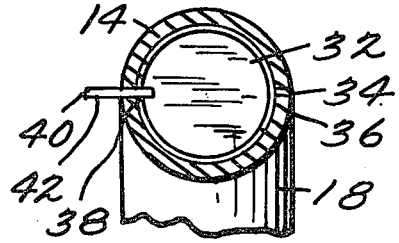
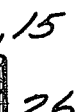
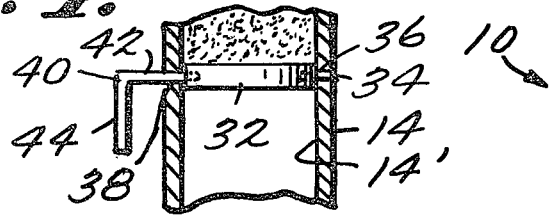
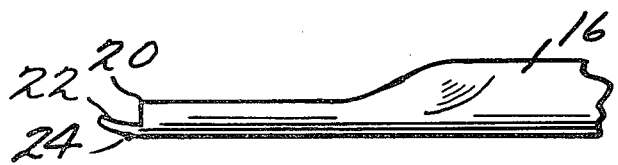
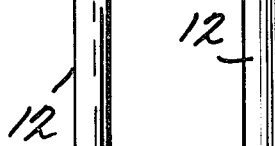
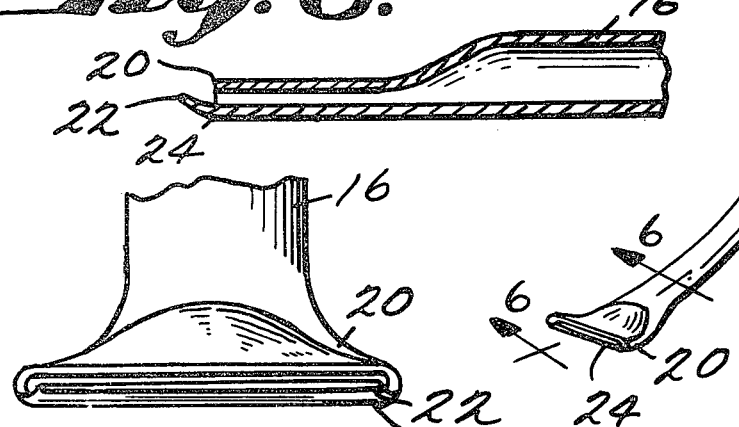

BEEHIVE MEDICATOR

This invention relates to apparatus for introducing medication into beehives, and more particularly to a beehive medicator for uniformly applying powdered medication to the interior of beehives.

It is often desirable or necessary to introduce medication to the interior of beehives for the purposes of maintaining or improving the health of the bees. In the past this has been a difficult and awkward procedure.

It is, therefore, an object of the present invention to provide a simple, but effective, beehive medicator apparatus for applying powdered medication to the interior of beehives.

Another object is to provide beehive medicator apparatus which enables the operator to introduce medication to the hive's interior without opening the hive and without requiring that the operator's hands closely approach the hive opening.

A further object of the invention is the provision of a beehive medicator which uniformly introduces powdered medication to the interior of beehives.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides for a beehive medicator including a substantially L-shaped, hollow, open-ended, tubular member defining an upper substantially straight section, a lower section, and an intermediate arcuate section connecting together the upper and lower sections at substantially a right angle with respect to each other.

Preferably, valve means are attached to the upper section and are provided in operative relationship with the upper section for controlling the movement of powdered medicament through the tubular member.

In accordance with the invention, the lower section of the medicator defines a horizontally flared open end, and the interior vertical dimension of the flared end is preferably less than the interior diametrical dimension of the tubular member.

It is also preferred that a lip member project from the flared end and substantially along the lower edge of the flared end. The lip member is preferably curved upwardly from the lower edge to direct powdered medicament upwardly and into the hive. It is also desirable that screening means be provided which are positioned across the interior opening of the upper section for preventing bees from moving up the interior of the tubular member and into contact with the medicator operator during use. The screening means also prevents stray bees, which may have moved into the upper end of the tubular member while the medicator was not in use, from being accidentially blown down through the medicator during use, and clogging of the medicator is avoided.

It is to be understood that both the foregoing general description and the following detailed description are exemplary and explanatory but are not restrictive of the invention.

The accompanying drawings, which are incorporated in and constitute a part of this specification, illustrate examples of preferred embodiments of the invention and, together with the description, serve to explain the principles of the invention.

FIG. 1 is a perspective view of the preferred medicator embodiment of this invention;

FIG. 2 is a sectional view of the medicator taken along the line 2—2 in FIG. 1 and looking in the direction of the arrows;

FIG. 3 is a sectional view of the medicator taken along the line 3—3 in FIG. 1 and looking in the direction of the arrows;

FIG. 4 is a sectional view of the medicator taken along the line 4—4 in FIG. 1 and looking in the direction of the arrows;

FIG. 5 is a fragmentary side elevation view of the medicator showing the flared end;

FIG. 6 is a sectional view of the medicator taken along the line 6—6 of FIG. 1 and looking in the direction of the arrows;

FIG. 7 is a fragmentary front elevation view showing the flared end; and

FIG. 8 is a perspective view of an alternative medicator embodiment.

With reference now to the drawings, wherein like reference characters designate like or corresponding parts throughout the several views, there is shown in FIGS. 1-7 a preferred embodiment of beehive medicator apparatus 10. Medicator 10 defines a substantially L-shaped, hollow, open-ended, tubular member 12 which includes an upper substantially straight section 14, a lower section 16 and an intermediate arcuate section 18 connecting together the upper and lower sections at substantially a right angle with respect to each other.

Lower section 16 defines a horizontally flared open end 20, and the interior vertical dimension of flared end 20 is preferably less than the interior diametrical dimension of tubular member 12.

A lip member 22 projects from flared end 20 and substantially along lower edge 24 of the flared end. Lip member 22 is also preferably curved upwardly from lower edge 24 so that the powdered medicament is directed upwardly and into the hive interior through the hive opening.

Screening means 26 are positioned within upper section 14 and across the interior opening of the upper section for preventing bees from moving up the interior of tubular member 12 and into contact with the medicator operator during use. In the preferred embodiment, screening means 26 include a plurality of substantially parallel, thin bars 28 which are positioned close enough together to prevent passage of bees therebetween. Screening means 26 are also preferably positioned near upper end 15 of upper section 14.

Valve means 30 are also preferably attached to upper section 14 and in operative relationship with the upper section for controlling the movement of powdered medicament through tubular member 12. Valve means 30 include a substantially circular disc 32 rotatably mounted within upper section 14. A pin or other conventional mounting member 34 may be attached or formed on the edge of disc 32, and pin 34 is rotatably seated within opening 36 located on the interior surface 14' of upper section 14. Aperture 38 extends through the wall of upper section 14, and aperture 38 is positioned at a location diametrically opposed to opening 36.

Lever 40 is attached to disc 32, and a portion of lever 40 extends in movable relationship through aperture 38. More specifically, base portion 42 of the lever is attached to disc 32 and extends through aperture 38 in movable relationship therewith. An arm portion 44 of lever 40 is located outside of upper section 14 and is attached to base portion 42 at substantially a right angle therewith. Base portion 42 of the lever is substantially coplaner with respect to disc 32, and arm portion 44 of the lever is sufficiently weighted to normally cause disc 32 to be positioned across the interior of upper section 14 in a closed position.

In operation of the preferred embodiment of this invention, disc 32 is normally held in a closed position because of the weight of arm portion 44 of lever 40. Medication in powdered form is poured by the operator into open upper end 15 of medicator 10. Disc 32 may be located at a predetermined distance below screening means 26 so that a predetermined dose of powdered medication will be provided when the medication is filled from disc 32 to the level of screening means 26.

The operator then inserts flared end 20 of the medicator into the flight opening of the beehive. Disc lever 40 is then rotated by the operator so as to cause disc 32 to rotate to an open position. This enables the powdered medication to fall through the interior of upper section 14 to arcuate section 18 and into lower section 16 of the medicator. While maintaining disc 32 in the open position, the operator then places his mouth around upper end 15 of the medicator and blows downwardly into tubular member 12. The force of this blow causes the powdered medication to move out of lower section 16, through flared end 20 and into the interior of the hive. The narrow vertical height of flared end 20 combined with the increased horiontal width of flared end 20 and curved lip member 22 cause the powdered medication to be sprayed in a uniform manner upwardly and into the interior of the beehive.

An alternative embodiment of the invention is illustrated in FIG. 8 wherein valve means 30 are eliminated from the medicator. The remaining structure of this embodiment is the same as that described with respect to the previous preferred embodiment.

In operation of the alternative embodiment, an amount of powdered medication is poured into upper end 15 of the medicator. The powdered medicament then falls through upper section 14 and comes to rest within arcuate section 18 and within lower section 16. The operator inserts flared end 20 in the flight opening of the hive. The operator then places his mouth over open, upper end 15 of the medicator and blows. The powdered medication is sprayed upwardly and into the interior of the beehive.

Tubular member 12 is preferably comprised of a durable plastic, such as polyvinylchloride. Disc 32 and lever 40 may also be comprised of a plastic material or a relatively light weight, corrosion resistant metal, such as aluminum. Similarly, screening means 26 are made of a corrosion resistant material, such as a durable plastic or light weight metal.

The medicators built to date have used a three-quarter inch hollow polyvinylchloride tubing for tubular member 12. Screening means 26 or bars 28 have been located three-quarters of an inch from upper end 15 of the medicator, and disc 32 is located four inches below upper end 15 of the medicator. Upper section 14 is three feet in length, arcuate section 18 is curved with a six inch radius, and lower section 16 is seven and one-half inches in length. The horizontal measurement or width of flared end 20 is two inches, and the vertical measurement of flared end 20 is one-quarter inch. It should be understood, of course, that these dimensions are exemplary and are not intended to limit the scope of the invention.

The invention in its broader aspects is not limited to the specific details shown and described, and departures may be made from such details without departing from the principles of the invention and without sacrificing its chief advantages.

What is claimed is:

1. Beehive medicator apparatus for applying powdered medication to the interior of a beehive, said apparatus comprising: a substantially L-shaped, hollow, open-ended, tubular member defining an upper substantially straight section, a lower section, and an intermediate arcuate section connecting together said upper and lower sections at substantially a right angle with respect to each other; said lower section defining a horizontally flared open end having an interior vertical dimension less than the interior diametrical dimension of said tubular member; and a lip member projecting from said flared end and substantially along the lower edge of said flared end.

2. Apparatus as in claim 1 wherein said lip member is curved upwardly from said lower edge.

3. Apparatus as in claim 2 further including screening means positioned across the interior opening of said upper section for preventing bees from moving up the interior of said tubular member and into contact with the medicator operator during use.

4. Apparatus as in claim 1 further including valve means attached to said upper section and in operative relationship therewith for controlling the movement of said powdered medication through said tubular member.

5. Apparatus as in claim 4 wherein said upper section defines an aperture through the wall thereof and wherein said valve means include a substantially circular disc rotatably mounted within said upper section adjacent to said aperture and a lever attached to said disc and extending in movable relationship through said aperture.

6. Apparatus as in claim 5 wherein said lever defines a base portion attached to said disc and extending through said aperture, and an arm portion located outside of said upper section and attached to said base portion at substantially a right angle therewith.

7. Apparatus as in claim 6 wherein said base portion is substantially coplanar with respect to said disc and wherein said arm portion is weighted to normally cause said disc to be positioned across said upper section in a closed position.

8. Apparatus as in claim 7 wherein said lip member is curved upwardly from said lower edge.

9. Apparatus as in claim 8 further including screening means positioned across the interior opening of said upper section for preventing bees from moving up the interior of said tubular member and into contact with the medicator operator during use while still permitting movement of said medication through said screening means.

10. Apparatus as in claim 9 wherein said screening means is positioned within said upper section a predetermined distance above said disc when said disc is in said closed position whereby a predetermined amount of said powdered medication can fill the space between said closed disc and said screening means.

11. Beehive medicator apparatus for applying powdered medication to the interior of a beehive, said apparatus comprising: a substantially L-shaped, hollow, open-ended, tubular member defining an upper substantially straight section, a lower section, and an intermediate arcuate section connecting together said upper and lower sections at substantially a right angle with respect to each other; valve means attached to said upper section and in operative relationship therewith for controlling the movement of said powdered medication through said tubular member; said upper section defining an aperture through the wall thereof and wherein said valve means include a substantially circular disc rotatably mounted within said upper section adjacent to said aperture and a lever attached to said disc and extending in movable relationship through said aperture; said lever defining a base portion attached to said disc and extending through said aperture and an arm portion located outside of said upper section and attached to said base portion at substantially a right angle therewith; said base portion being substantially coplanar with respect to said disc and said arm portion being weighted to normally cause said disc to be positioned across the interior of said upper section in a closed position; said lower section defining a horizontally flared open end having an interior vertical dimension less than the interior diametrical dimension of said tubular member; and a lip member projecting from said flared end and substantially along the lower edge of said flared end.

12. Apparatus as in claim 11 wherein said lip member is curved upwardly from said lower edge.

13. Apparatus as in claim 12 further including screening means positioned across the interior opening of said upper section for preventing bees from moving up the interior of said tubular member and into contact with the medicator operator during use while still permitting movement of said medicament through said screening means.

14. Apparatus as in claim 13 wherein said screening means is positioned within said upper section a predetermined distance above said disc when said disc is in said closed position, whereby a predetermined amount of said powdered medicament can fill the space between said closed disc and said screening means.

* * * * *